United States Patent [19]

Reuben

[11] Patent Number: 4,940,317

[45] Date of Patent: Jul. 10, 1990

[54] ELECTRIC HEATING DEVICE FOR MIRROR

[76] Inventor: Ronnie Reuben, c/o 555 Chabanel West, Suite 1009, Montreal, Quebec, Canada

[21] Appl. No.: 226,995

[22] Filed: Aug. 1, 1988

[51] Int. Cl.$^5$ .......................... G02B 5/08; B60R 1/02; H05B 1/00

[52] U.S. Cl. ..................................... 350/588; 219/219

[58] Field of Search ................. 350/588; 219/219, 203

[56] References Cited

U.S. PATENT DOCUMENTS

| | | | |
|---|---|---|---|
| 2,564,836 | 8/1951 | Elsenheimer | 219/219 |
| 3,160,736 | 12/1964 | Catterson | 219/219 |
| 3,686,473 | 8/1972 | Shirn et al. | 350/588 |
| 3,839,620 | 10/1974 | Seibel et al. | 219/219 |
| 3,887,788 | 6/1975 | Seibel et al. | 219/219 |
| 3,995,140 | 11/1976 | Kuiff et al. | 219/203 |
| 4,060,712 | 11/1977 | Chang | 219/219 |
| 4,439,771 | 3/1984 | Kume et al. | 219/203 |
| 4,459,470 | 7/1984 | Shlichta et al. | 219/219 |
| 4,513,196 | 4/1985 | Bartelsen et al. | 219/203 |
| 4,634,242 | 1/1987 | Taguchi et al. | 350/588 |

FOREIGN PATENT DOCUMENTS

| | | | |
|---|---|---|---|
| 2908623 | 9/1980 | Fed. Rep. of Germany | 350/588 |
| 3202344 | 7/1983 | Fed. Rep. of Germany | 219/219 |
| 3412055 | 10/1985 | Fed. Rep. of Germany | 219/219 |
| 60-47745 | 3/1985 | Japan | 350/588 |
| 1391425 | 4/1975 | United Kingdom | 219/219 |
| 2041859 | 9/1980 | United Kingdom | 350/588 |

Primary Examiner—Bruce Y. Arnold
Assistant Examiner—Martin Lerner
Attorney, Agent, or Firm—Oblon, Spivak, McClelland, Maier & Neustadt

[57] ABSTRACT

A mirror heating device for securement to a rear coated surface of a mirror for heating a mirror to a temperature exceeding the ambient temperature of the mirror when used in an area where there is water vapor in the air. The device comprises a first conductive strip which is securable adjacent an edge of the rear surface of the mirror. A connection is made to the first conductive strip to apply a d.c. voltage thereto. A second conductive strip is located adjacent an opposed edge of the rear coated surface of the mirror and a ground connection is connected to that second strip. An intermediate resistive conductor element extends between the first and second conductive strips and is in contact therewith to heat the mirror. An electrical insulator extends over the first and second conductive strips and the intermediate resistive conductor to insulate same.

11 Claims, 2 Drawing Sheets

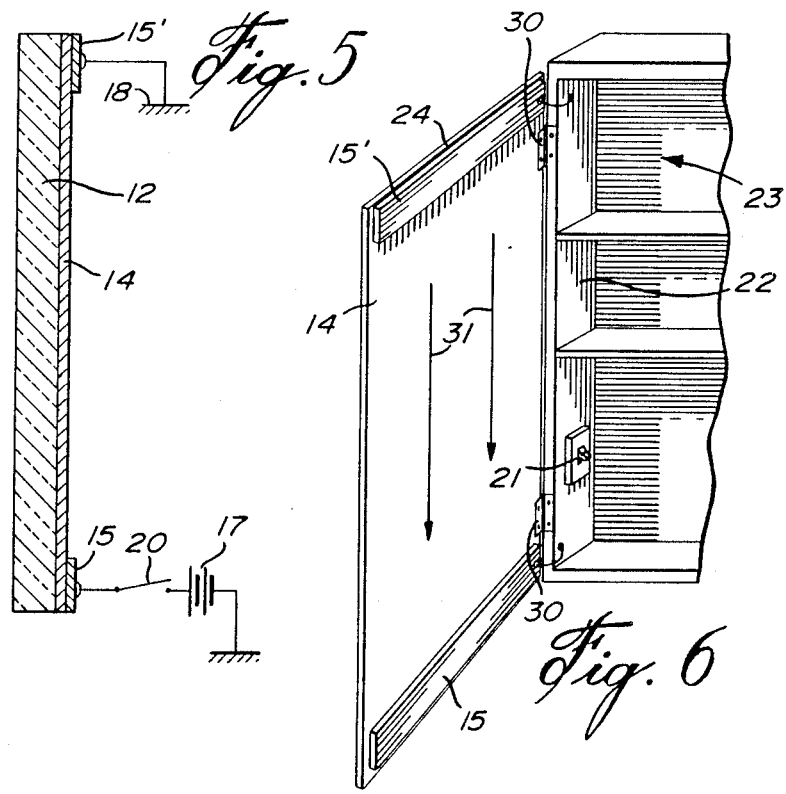
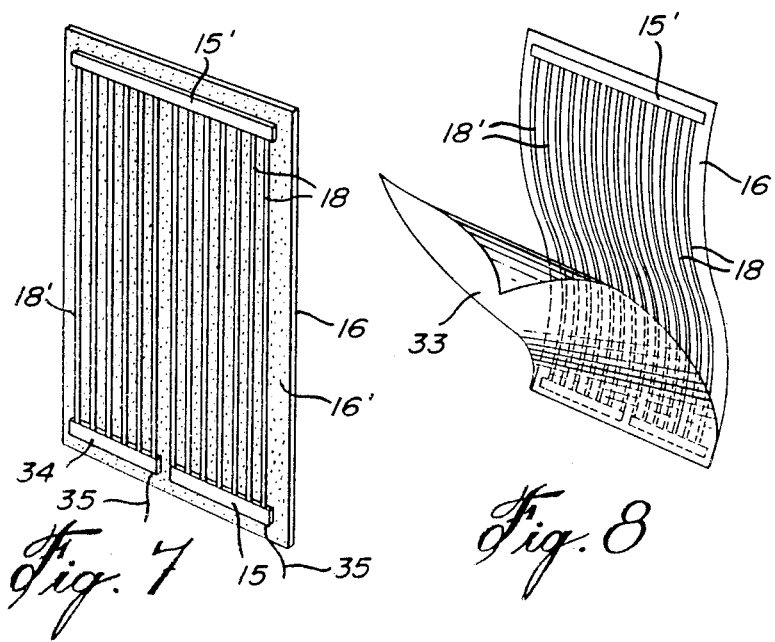

ELECTRIC HEATING DEVICE FOR MIRROR

BACKGROUND OF INVENTION (a) Field of the Invention

The present invention relates to an improved electrical heating device securable to a mirror rear coated surface to heat the mirror to a temperature exceeding the ambient temperature of the mirror when used in an area where there is water vapour in the air so that there is no condensation on the mirror.

(b) Description of Prior Art

It is known to increase the temperature of a mirror above that of the ambient temperature so that condensation does not occur on the surface. This is done in the prior art by circulating hot water against the rear surface of the mirror, as disclosed in U.S. Pat. No. 4,558,929, for example, or by applying a current across a resistive film to defrost the mirror such as described in U.S. Pat. Nos. 3,686,473 or 3,530,275.

SUMMARY OF INVENTION

The present invention relates to a mirror heating device of the general type as disclosed in the above-mentioned last two patents but which is greatly improved whereby to facilitate the installation of such heating device to a mirror rear surface.

Another feature of the present invention is to provide an improved mirror heating device which may be supplied in kit form and easily adhesively secured to the rear coated surface of a mirror.

Another feature of the present invention is to provide an improved mirror heating device which is connectable to the electrical razor outlet which is normally installed in a bathroom.

Another feature of the present invention is to provide a mirror heating device which does not require any expert skill for installation and which may be adapted to mirrors of all sizes and configurations.

Another feature of the present invention is to provide an improved mirror heating device which may be packaged in a small carton and adhesively secured to the rear coated surface of a mirror.

According to the above features, from a broad aspect, the present invention provides a mirror heating device for securement to a rear coated surface of a mirror for heating a mirror to a temperature exceeding the ambient temperature about said mirror when used in an area where there is water vapour in the air. The device comprises a first conductive strip securable adjacent an edge of the rear coated surface of the mirror. Connecting means is provided for applying a d.c. voltage to the conductive strip. The second conductive strip is located adjacent an opposed edge of the rear coated surface of the mirror. A ground connection is connected to the second strip. An intermediate resistive conductor means extends between the first and second conductive strips and is provided in contact therewith to heat the mirror. Electrical insulating means extends over the first and second conductive strips and the intermediate resistive conductor means for insulating same.

According to a further feature of the present invention, the intermediate resistive conductor is a thin metal plate which is adhesively secured over at least a major portion of the rear coated surface of the mirror.

According to a still further feature of the present invention, the first and second conductive strips and the intermediate conductors are sandwiched between the rear coated surface of the mirror and an insulating protective sheet by means of double-coated adhesive foam tape resistant to heat generated by the conductors and the metal strips.

Another feature of the present invention is to provide an insulating sheet with an adhesive surface in which the electrically conductive metal strips and intermediate conductors are adhesively retained on the adhesive surface and wherein the insulating sheet is itself adhesively secured to the conductive metal plate to sandwich the conductive strips and intermediate conductors between the metal plate and the insulating sheet.

Another feature of the present invention is to provide an adhesive insulating sheet having conductors secured thereon and which insulating sheet may be cut to fit a mirror configuration.

BRIEF DESCRIPTION OF DRAWINGS

A preferred embodiment of the present invention will now be described with reference to the examples thereof as illustrated in the accompanying drawings in which:

FIG. 5 is a section view showing another example of the construction of the heating device of the present invention;

FIG. 6 is a perspective view of a medicine cabinet wherein the mirror door thereof is adapted with the heating device of FIG. 5;

FIG. 7 is a perspective view showing the heating device secured to a rigid insulating adhesive sheet; and FIG. 8 is a perspective view showing the heating device secured to a flexible insulating adhesive sheet having a peel-off sheet disposed over the adhesive surface thereof.

DESCRIPTION OF PREFERRED EMBODIMENTS

Figure 1:
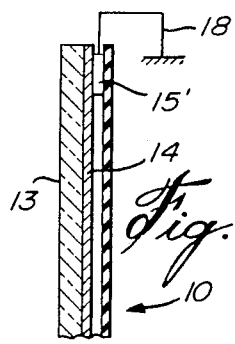
FIG. 1 is a sectional view of the mirror heating device of the present invention.
Figure 1:
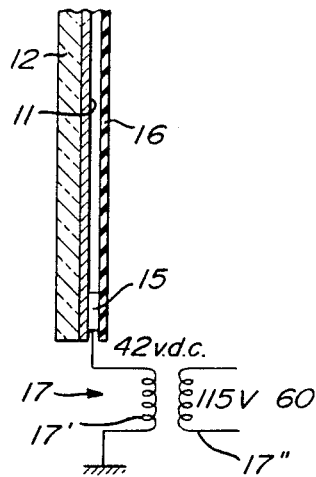
Figure 2:
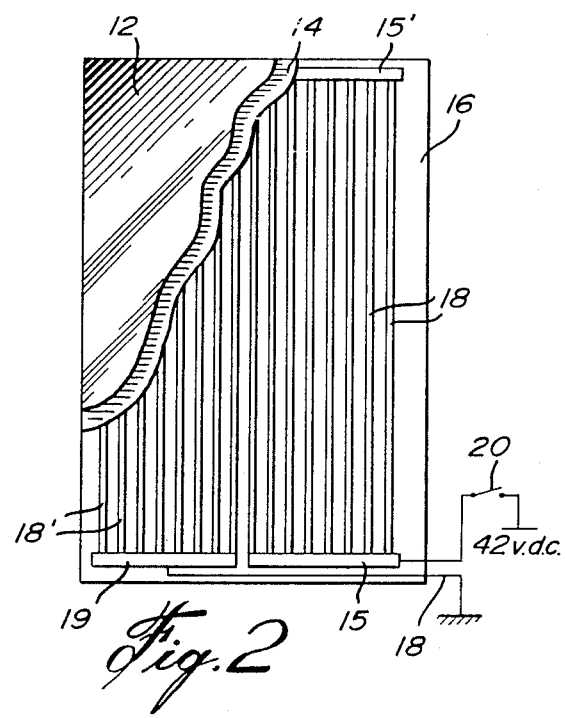
FIG. 2 is a fragmented front view of a mirror having the heating device of the present invention secured thereto.

Referring now to the drawings, and more particularly to FIGS. 1 and 2, there is shown generally at 10, the heating device of the present invention as secured to the rear coated surface 11 of a mirror 12 whereby to heat the mirror and its front surface 13 to a temperature exceeding the ambient temperature about the mirror when used in an area where there is water vapour in the air. It is well known that if the temperature of an object exceeds the ambient temperature of air containing water vapour that these vapours will not condensate on such object. To achieve this, there is adhesively or otherwise secured to the rear coated surface 13 of the mirror, a thin metal plate 14 having opposed elongated conductive strips 15 and 15' secured respectively adjacent opposed end edges of the metal plate. An insulating material 16 is disposed over the metal strips 15 and 15' to insulate same electrically from the metal plate. An intermediate conductor is constituted by the metal plate 14 to conduct heat therein which is generated by the electricity flowing in the metal strips. A voltage supply 17, herein the secondary 17' of a voltage converter transformer is secured to the terminal 15 and the other terminal is connected to a ground connection 18. The transformer primary 17" is connected to a local supply source and the output of the secondary provides 12 volts d.c. Such source is also readily available from an electrical razor outlet normally found in bathrooms and the supply can be taken from that source.

The intermediate conductor is constituted by intermediate resistive conductor means in the form of flat metal conductor strips 18 as shown in FIG. 2 and are held in physical contact with the metal plate by adhesive means as will be described more specifically with reference to FIGS. 3, 4, 7 and 8.

In order to achieve a better distribution of heat throughout the metal plate surface area, the conductors are disposed in an arrangement as shown in FIG. 2. As hereinshown, there is provided a third conductive strip 19 which is secured in alignment with the conductive strip 15 in a half portion of the lower edge of the metal plate 14. The power supply 17 is connected to the strip 15 and the current flows through these conductors 18 and through the metal strip 15' and then back down through the conductors 18' to the conductive strip 19 and to the ground connection 18. Thus, there is heat flow throughout the surface area of the metal plate 14 due to the heat generated by the many strips and which results in very efficient and rapid heating of the plate 14 which then transfers the heat onto the mirror 12. The plate also retains heat much longer and distributes it more evenly. A switch 20 may be provided to switch on the heater device only when required and this switch can be conveniently mounted in a housing 21 which could be secured in the side wall 22 of a medicine cabinet 23, where such mirrors 12 are usually utilized as the door 24 of the medicine cabinet, as shown in FIG. 6.

Figure 4:
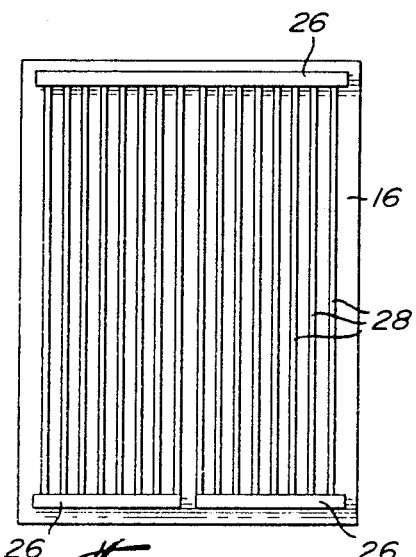
FIG. 4 is a plan view of an embodiment showing the configuration of the double adhesive spacers.
Figure 3:
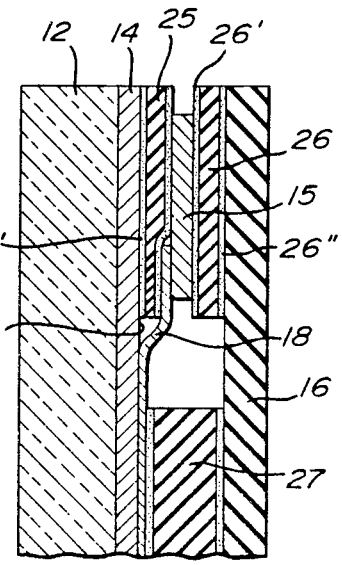
FIG. 3 is an exploded view showing the manner in which the conductive strips and intermediate conductors are sandwiched between a rear metal plate and an insulating sheet.

Referring now to FIGS. 3 and 4, it can be seen that the conductive strips 15 and 15' are insulatingly secured between the rear metal plate 14 and this can be done by the provision of an insulating tape 25 having an adhesive coated surface 25' which is secured to the top edge of a metal plate 14. The electrical conductive strip 15 is sandwiched between the tape 25 and another tape 26 which is adhesively coated on both sides 26' and 26" to sandwich the contact 15 between the tapes 25 and 26. The outer adhesive coating 26" is utilized to hold the insulating plate 16 behind the metal plate 14. The electrical conductors 18 extend between the sandwich tapes 25 and 26 and held against the conductive strips 15 by these tapes and are then disposed in contact over the rear surface 14' of the metal plate 14 by additional double-adhesive coated tapes 27 or elongated double-adhesive coated tapes 28 extending longitudinally along the conductors intermediate the tapes 26 disposed over the metal strips. These tapes provide insulation on the conductors and spacing of the rear insulating plate 16. These adhesively coated tapes are well known in the art and manufactured by the 3 M Company and are formed with various core substances such as acrylic, neoprene, etc. or any substance capable of resisting the heat generated by the metal strips and metal conductors or the metal plate and capable of resisting shear caused by the load adhesively retained on the back plate 16. An array of longitudinal and transverse tapes can also be provided depending on the weight of the rear insulating sheet 16.

FIGS. 5 and 6 show another example of the construction of the heating device of the present invention and wherein the metal plate 14 acts as the intermediate conductor between the lower conductive strip 15 and the upper conductive 15' which are adhesively retained on the metal plate 14. With such an arrangement, the metal plate 14 is insulated or spaced from the frame 22 of the medicine cabinet so that the current will flow entirely across the metal plate in the direction of arrows 31 without being short-circuited which would result in inadequate heating of the entire surface of the mirror.

FIG. 7 shows another embodiment where the insulating sheet 16 is provided as a solid sheet of insulating plastics material capable of resisting the heat generated by the conductors 18 and 18' and is herein provided with an adhesive coated rear surface 16' on which the conductors 18 and 18' as well as the strip connectors 15, 15' and 34 are all adhesively retained. The adhesive surface coating between the conductors 18 and 18' and at the opposed ends of the sheet 16 will be sufficient to retain the sheet against the metal plate 14 in the rear of the mirror. A peel-off protective sheet 33, as shown in FIG. 8, may be disposed over the adhesive coated surface 16' to protect the adhesive. This embodiment lends itself to providing the heater in a kit form which could be adapted to mirrors of different sizes. The user could cut the sheet to fit a mirror and redispose the conductive strips against the adhesive surface of the insulating plate 16. The wires 34 would then be connected as required.

FIG. 8 shows a still further example of the construction of the rear insulating sheet 16 of FIG. 7, and as hereinshown, this sheet is made of a flexible insulating material and the conductive strips and wires are also adhesively secured on an adhesive rear surface coating which is protected by a peel-off sheet 33. Because this sheet 16 is flexible, it may be rolled into a small tubular package.

In conclusion, the present invention provides for a heating device which is easy to install to mirrors, and particularly those utilized in bathrooms or in areas where the percentage humidity in the air is high and wherein such heating devices may also be provided in kit form for easy installation by unskilled persons. It is pointed out that it is within the ambit of the present invention to cover any obvious modifications of the examples illustrated herein, provided such modifications fall within the scope of the appended claims.

I claim:

1. A mirror heating device for securement to a rear thermally conductive surface of a mirror for heating a mirror to a temperature exceeding ambient temperature about said mirror when used in an area where there is water vapor in the air, said device comprising a first electrically insulated conductive strip adhesively securable adjacent an edge of said rear coated surface of said mirror, connecting means or applying a DC voltage to said conductive strip, a second electrically insulated conductive strip located adjacent an opposed edge of said rear coated surface of said mirror, a ground connection connected to said second strip, intermediate electrically insulating resistive conductors extending between said first and second conductive strips and in thermal conductive contact therewith to heat said mirror, and electrical insulating means extending over said first and second conductive strips and said intermediate resistive conductor means for insulting a back surface of said mirror, said thermally conductive surface being a thin metal plate adhesively secured over at least a major portion of a rear surface of said mirror, said conductive strip adjacent said lower edge being connected to said connecting means which is a wire conductor secured to a positive terminal of a DC voltage source, a third electrically insulated conductive metal strip insulatingly secured adjacent one of said edges of said metal plate, said third metal strip being axially aligned with said first metal strip, said second metal strip being an elongated strip, said first strip having a plurality of electrically insulated conductors connected thereto and a portion of said second metal strip and extending in spaced-apart parallel alignment and in adhesive contact with said thin metal plate, whereby to heat said plate by heat transfer when current flows in said conductors, and a further plurality of electrically insulated conductors connected to said third metal strip and a portion of said second metal strip and also in adhesive contact with said metal plate, said first conductive strip being connected to a positive terminal of a DC voltage source by said connecting means, said third conductive strip being grounded, said metal strips being sandwiched between opposed electrical insulating layers, at least said layer adjacent said rear coated surface of said mirror having an adhesive surface for securing said metal strip thereto.

2. A mirror heating device as claimed in claim 1 wherein said d.c. voltage source is the positive side of a secondary winding of a voltage converter transformer, the primary winding of said transformer being connected to an alternating household supply source.

3. A mirror heating device as claimed in claim 1 wherein at least one of said insulating layers has opposed adhesive coatings, said other insulating layer having an adhesive coating for an exterior surface thereof, said insulating means being a back plate of insulating material secured behind said rear coated surface by said adhesive coating of said other insulating layer and extending over at least said conductors.

4. A mirror heating device as claimed in claim 3 wherein there is further provided a plurality of spacers of electrical insulating material having opposed adhesive surfaces and disposed between said back plate and said rear coated surface of said mirror support said back plate in position.

5. A mirror heating device as claimed in claim 4 wherein said spacers extend longitudinally over each of said conductors and disposed between said conductive strips to substantially conceal said conductors.

6. A mirror heating device as claimed in claim 5 wherein said insulating layers and spacers are double-coated adhesive foam tape resistant to heat generated by said conductors and heated metal plate.

7. A mirror heating device as claimed in claim 4 wherein said plurality of conductors are flat strip conductors adhesively held against said metal conductive strips.

8. A mirror heating device as claimed in claim 1 wherein said electrical insulating means is an insulating sheet of electrically insulating material having at least part of one surface thereof provided with an adhesive, said first and second conductive strips being adhesively secured to said insulating sheet, said insulating sheet being adhesively secured over said thin metal plate to sandwich said conductive strips between said thin metal plate and said insulating material.

9. A mirror heating device as claimed in claim 8, wherein said insulating sheet is a thin flexible sheet.

10. A mirror heating device as claimed in claim 9 wherein said insulating sheet is a glass plate.

11. A mirror heating device for securement to a rear thermally conductive surface of a mirror for heating a mirror to a temperature exceeding ambient temperature about said mirror when used in an area where there is water vapor in the air, said device comprising an insulating sheet of electrically insulating material having at least part of one surface thereof provided with an adhesive, a first electrically insulated conductive strip secured adjacent an edge of said adhesive surface of said sheet, connecting means for applying a DC voltage to said conductive strip, a second electrically insulated conductive strip located adjacent an opposed edge of said adhesive surface of said sheet, a ground connection connected to said second strip, intermediate resistive electrically insulated conductors adhesively retained between said first and second conductive strips and in electrical contact therewith, said conductive strips having a release adhesive, said sheet being adhesively securable against said rear thermally conductive surface of said mirror to sandwich said resistive strips and conductors between said mirror and said sheet and in contact with said rear surface to transfer heat to said mirror when current flows through said strips and conductors.

* * * * *